(12) United States Patent
Rule et al.

(10) Patent No.: US 10,467,622 B1
(45) Date of Patent: Nov. 5, 2019

(54) USING ON-DEMAND APPLICATIONS TO GENERATE VIRTUAL NUMBERS FOR A CONTACTLESS CARD TO SECURELY AUTOFILL FORMS

(71) Applicant: Capital One Services, LLC, McLean, VA (US)

(72) Inventors: Jeffrey Rule, McLean, VA (US); Wayne Lutz, McLean, VA (US); Paul Moreton, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/265,961

(22) Filed: Feb. 1, 2019

(51) Int. Cl.
*G06Q 20/38* (2012.01)
*G06F 16/955* (2019.01)
*G06Q 20/34* (2012.01)
*G06Q 20/40* (2012.01)

(52) U.S. Cl.
CPC ....... *G06Q 20/385* (2013.01); *G06F 16/9566* (2019.01); *G06Q 20/352* (2013.01); *G06Q 20/3829* (2013.01); *G06Q 20/409* (2013.01); *G06Q 20/4018* (2013.01); *G06Q 2220/00* (2013.01)

(58) Field of Classification Search
CPC .. G06Q 20/00–425; G06Q 2220/00–18; G06F 16/00–986
USPC .......................................................... 705/67
See application file for complete search history.

(56) References Cited

U.S. PATENT DOCUMENTS

| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |

(Continued)

FOREIGN PATENT DOCUMENTS

| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Mohammad A. Nilforoush
*Assistant Examiner* — Wodajo Getachew

(57) ABSTRACT

A first application may output a form comprising payment fields. An operating system (OS) may receive, from a contactless card, a uniform resource locator (URL) comprising encrypted data. A second application received from the URL by the OS may be executed. The second application may transmit the encrypted data to an authentication server, the authentication server to verify the encrypted data. The second application may receive, from a virtual account number server, a virtual account number, an expiration date associated with the virtual account number, and a CVV associated with the virtual account number. The second application may provide the virtual account number, expiration date, and CVV to an autofill service of the OS. The autofill service of the OS may autofill the virtual account number the payment fields of the first application.

16 Claims, 10 Drawing Sheets

(56) References Cited

U.S. PATENT DOCUMENTS

| | | |
|---|---|---|
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haab |
| 6,990,588 B1 | 1/2006 | Yasukura |
| 7,006,986 B1 | 2/2006 | Sines et al. |
| 7,085,931 B1 | 8/2006 | Smith et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B2 | 2/2013 | Medina, III et al. |
| 8,369,960 B2 | 2/2013 | Tran et al. |
| 8,371,501 B1 | 2/2013 | Hopkins |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,559,872 B2 | 10/2013 | Butler |
| 8,566,916 B2 | 10/2013 | Bailey et al. |
| 8,567,670 B2 | 10/2013 | Stanfield et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |

(56) References Cited

U.S. PATENT DOCUMENTS

| | | |
|---|---|---|
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0208449 A1 | 11/2003 | Diao |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0075985 A1 | 4/2005 | Cartmell |
| 2005/0081038 A1 | 4/2005 | Arditti Modiano et al. |
| 2005/0156026 A1 | 7/2005 | Ghosh et al. |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |

(56) References Cited

U.S. PATENT DOCUMENTS

| | | |
|---|---|---|
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2010/0313115 A1* | 12/2010 | Varone .................. G06F 16/986 715/234 |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0221474 A1* | 8/2012 | Eicher .................. G09C 5/00 705/51 |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Obome |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0054474 A1 | 2/2013 | Yeager |
| 2013/0065564 A1 | 3/2013 | Conner et al. |
| 2013/0073818 A1* | 3/2013 | Wakerly .............. G06Q 20/352 711/156 |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0089586 A1 | 3/2015 | Ballesteros |
| 2015/0127838 A1* | 5/2015 | Li ...................... H04L 67/02 709/227 |
| 2015/0134452 A1 | 5/2015 | Williams |
| 2015/0170138 A1 | 6/2015 | Rao |
| 2015/0178724 A1 | 6/2015 | Ngo et al. |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1* | 1/2016 | Tsui ...................... G06Q 20/322 705/75 |
| 2016/0048913 A1 | 2/2016 | Rausaria et al. |
| 2016/0055480 A1 | 2/2016 | Shah |
| 2016/0057619 A1 | 2/2016 | Lopez |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |

(56) References Cited

U.S. PATENT DOCUMENTS

| | | |
|---|---|---|
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1* | 12/2018 | Gaddam ............... H04L 9/3263 |
| 2019/0014107 A1 | 1/2019 | George |
| 2019/0019375 A1 | 1/2019 | Foley |
| 2019/0036678 A1* | 1/2019 | Ahmed ................... H04L 9/006 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved fro Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

(56) References Cited

OTHER PUBLICATIONS

Song, et al., "The AES-CMAC Algorithm", Network Working Group RFC: 4493 memo [online] 2006 [retrieved on Mar. 25, 2019]. Retrieved from Internet URL: https://tools/ieff.org/html/rfc4493, 21 pages.

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug Big Seven open source crypto-messengers to be compared—or: comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Plafform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://supportapple.com/guide/safari/use-autofill-brw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 101145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC", Annex Cloud [online] May 19, 2017 [retrieved on Jul. 3, 2019]. Retrieved from Internet URL: https://www.annexcloude.com/blog/benefits-unified-platform/, 13 pages.

* cited by examiner

US 10,467,622 B1

USING ON-DEMAND APPLICATIONS TO GENERATE VIRTUAL NUMBERS FOR A CONTACTLESS CARD TO SECURELY AUTOFILL FORMS

TECHNICAL FIELD

Embodiments herein generally relate to computing platforms, and more specifically, to using on-demand applications to generate virtual numbers for a contactless card to securely autofill form fields.

BACKGROUND

Account identifiers for payment cards are often long numeric and/or character strings. As such, it is difficult for a user to manually enter the account identifier correctly. Indeed, users often make mistakes and enter incorrect account numbers into computing interfaces (e.g., payment interfaces). Often, native operating system (OS) applications downloaded from application stores may include functionality to assist users in entering account identifiers into forms. However, some users may not have such applications on their devices. Therefore, these users must manually enter the account identifier correctly.

SUMMARY

Embodiments disclosed herein provide systems, methods, articles of manufacture, and computer-readable media for tapping a contactless card to a computing device to securely generate virtual card numbers which can be autofilled in form fields. According to one example, a first application may output a form comprising payment fields. An operating system (OS) may receive, from a contactless card, a uniform resource locator (URL) comprising encrypted data. A second application may be dynamically downloaded and installed from the received URL. The second application may transmit the encrypted data to an authentication server, the authentication server to verify the encrypted data. The second application may receive, from a virtual account number server, a virtual account number, an expiration date associated with the virtual account number, and a CVV associated with the virtual account number. The second application may provide the virtual account number, expiration date, and CVV to an autofill service of the OS. The autofill service of the OS may autofill the virtual account number the payment fields of the first application.

DETAILED DESCRIPTION

Figure 1A:
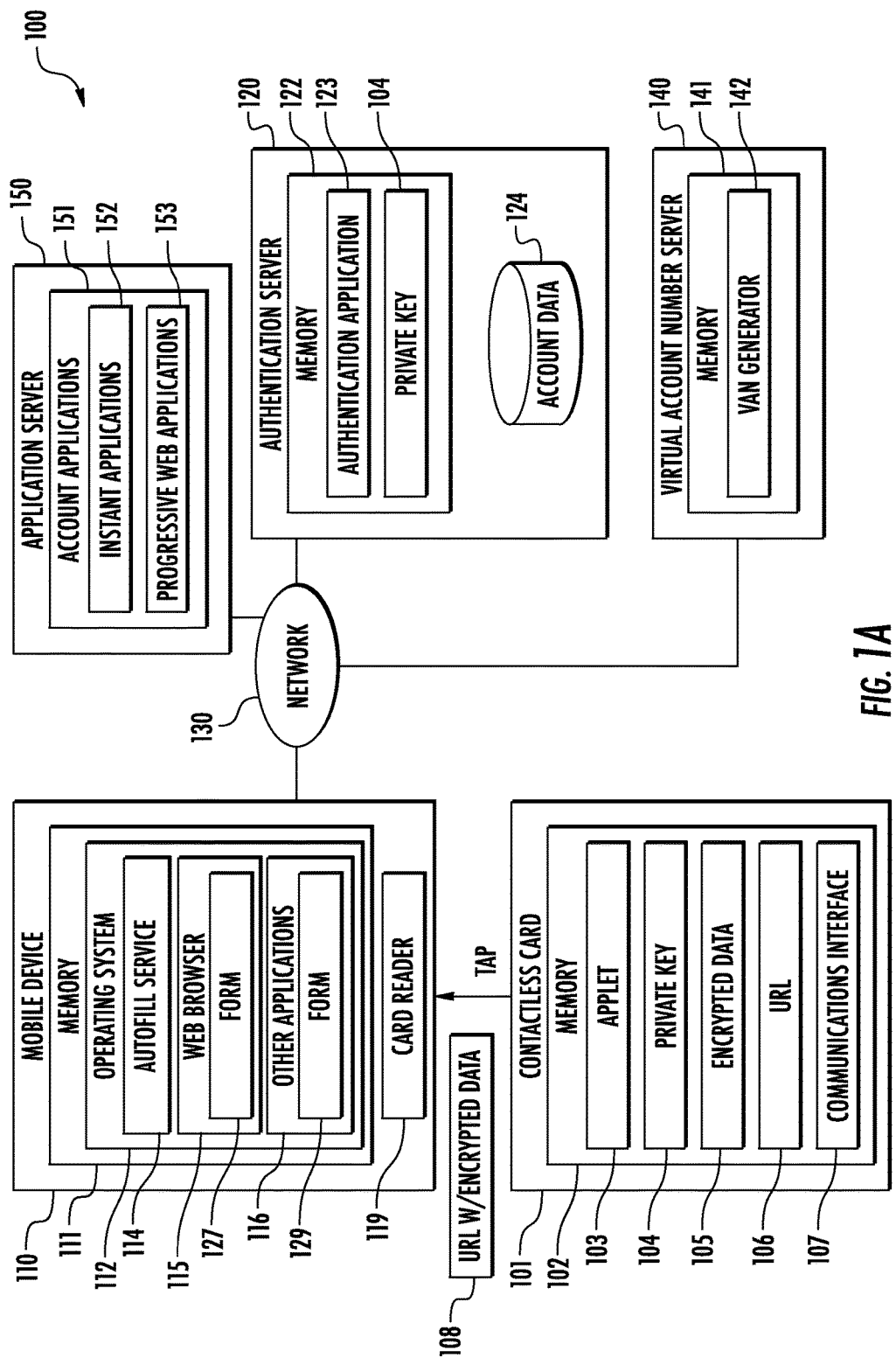
FIGS. 1A-1C illustrate embodiments of a system to tap a contactless card to a computing device to securely generate virtual card numbers which can be autofilled in form fields.

Embodiments disclosed herein provide secure techniques to use a contactless card to generate card data (e.g., an account number, expiration date, and/or card verification value (CVV)) which can be automatically filled to a form on a computing device without requiring applications (e.g., banking applications, account management applications, payment applications, etc.) to be pre-installed on the device. Generally, the contactless card may come within communications range of a computing device, e.g., via a tap gesture, when the computing device is outputting a form including card data fields. Doing so causes the contactless card to generate a uniform resource locator (URL) which is transmitted to the computing device. At least a portion of the URL may be directed to an application server hosting one or more applications and/or application segments. The applications may include applications available via application stores, while the segments of the applications may include a portion the application (e.g., one or more pages, one or more functions, etc.). For example, the application segments may be on-demand applications, such as instant applications and/or progressive web applications. One or more application segments associated with the URL may be downloaded to and executed on the computing device.

The URL generated by the contactless card may further include data used by an authentication server as part of a validation process. For example, the URL may include encrypted data that is decrypted by the server as part of the validation process. The downloaded application segments may receive the URL and extract the encrypted data. The downloaded application may then transmit the encrypted data to the authentication server for validation. Once validated, the authentication server may instruct a virtual account number server to generate card data for the account associated with the contactless card. The card data may include a virtual account number, an expiration date, a CVV, and an address of the user. A virtual account number may be an account number that is different than the account number associated with the contactless card. The generated card data may then be transmitted to the application segments executing on the computing device. The application segments may provide the card data to an autofill service of the OS. The autofill service may then automatically fill the card data may into the corresponding payment fields of the form.

Advantageously, embodiments disclosed herein improve the security of all devices and associated data. For example, embodiments disclosed herein provide the security of applications installed through application stores when autofilling card data without requiring users to install the application from the application store on their computing device. Furthermore, conventional approaches require the user to manually enter card data into a form. However, doing so may allow other users or devices to capture the card data as the user enters the card data into the form. By eliminating the need for the user to manually enter card data into the form, the security of the card data is enhanced.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile devices 110, an authentication server 120, a virtual account number server 140, and an application server 150. The contactless cards 101 are representative of any type of payment cards, such as a credit card, debit card, ATM card, gift card, and the like. The contactless cards 101 may comprise one or more chips (not depicted), such as a radio frequency identification (RFID) chip, configured to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The servers 120, 140, 150 are representative of any type of computing device, such as a server, workstation, compute cluster, cloud computing platform, virtualized computing system, and the like.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an autofill service 114, a web browser 115, and one or more other applications 116. The autofill service 114 injects data into the views of other applications (e.g., the web browser 115 and/or the other applications 116) to fill forms in the other applications. The autofill service 114 may also retrieve user data from the views in an application and store the data for later use. The autofill service 114 is used as a reference example herein and should not be considered limiting of the disclosure. The disclosure is equally applicable to other types of code that automatically fill form fields in an application and/or web page by injecting data into the form fields, such as an accessibility service. The web browser 115 is an application that allows the mobile device 110 to access information via the network 130 (e.g., via the Internet). In operation, the web browser 115 may access content that includes one or more forms 127. For example, the web browser 115 may load a bank card management page that includes one or more forms 127 with fields for card data (e.g., a name field, a card number field, an expiration date field, a CVV field, a billing address field, shipping address field, etc.). The other applications 116 are representative of any application that includes one or more forms 129 with fields for card data (e.g., a name field, a card number field, an expiration date field, a CVV field, a billing address field, shipping address field, etc.). For example, the other applications 116 include dedicated merchant applications for processing purchases, applications for services (e.g., taxi services, delivery services, etc.), and the like. Each example of the other applications 116 includes one or more forms 129 with fields for card data.

As another example, a user may make purchases from a merchant's website using the web browser 115 and/or the other application 116 provided by the merchant. To complete the transaction, the user must provide card data to one or more forms 127 in the web browser 115 and/or the forms 129 of the other application 116. The use of a web browser 115 and/or the other applications 116 as reference examples herein should not be considered limiting of the disclosure, as the disclosure is equally applicable to all types of applications that include forms with fields for card data and all types of forms with fields for card data.

Generally, a user may encounter a form 127, 129 that includes one or more fields for card data (e.g., a name field, a card number field, an expiration date field, a CVV field, a billing address field, shipping address field, etc.). Conventionally, the user is required to manually enter their name, card number, expiration date, CVV, and/or address information. Some mobile operating systems allow such data to be autofilled into forms, but other mobile operating systems impose restrictions on autofilling such data. Furthermore, in operating systems that allow the data to be autofilled in forms, the user must be authenticated through a dedicated application to do so. For example, prior solutions require the user to install an account management application provided by the issuer of the contactless card 101 and authenticate in the application to autofill card data in the forms 127, 129. Advantageously, however, embodiments disclosed herein solve such issues by leveraging the contactless card 101 to trigger the generation of a virtual account number, expiration date, and/or CVV that can be copied to the autofill service 114 of the OS 112 without requiring an application (such as the account management application) that is preinstalled on the device 110.

To do so, a user may tap the contactless card 101 to the mobile device 110, thereby bringing the contactless card 101 sufficiently close to the card reader 119 of the mobile device 110 to enable NFC data transfer between the communications interface 107 of the contactless card 101 and the card reader 119 of the mobile device 110. In some embodiments, the mobile device 110 may trigger the card reader 119 via an application program interface (API) call. In one example, the mobile device 110 triggers the card reader via an API call responsive to the user tapping or otherwise selecting an element of the user interface, such as a form field. In addition and/or alternatively, the mobile device 110 may trigger the card reader 119 based on periodically polling the card reader 119. More generally, the mobile device 110 may trigger the card reader 119 to engage in communications using any feasible method. After communication has been established between mobile device 110 and contactless card 101 the applet 103 executing on a processor (not pictured) of the contactless card 101 generates and transmits data to the mobile device 110 via the communications interface 107. In some embodiments, the data generated by the contactless card 101 may include a URL 106. The URL may be directed to the application server 150, or some other location that is hosting one or more account applications 151. When the OS 112 receives the URL 106, the OS may dynamically download an account application 151 from the URL 106, and dynamically install the account application 151 on the device. The URL 106 may further be a universal link URL (or deep link URL) that opens a local resource (e.g., one or more specific pages of the associated account applications 151). The pages of the account applications 151 that should be opened upon execution on the mobile device 110 may be specified as parameters of the URL.

More generally, the URL 106 is representative of one or more URLs (and/or uniform resource identifiers (URIs)) directed to one or more account applications 151 of the application server 150. The applet 103 may select the URL 106 based on any suitable selection technique (e.g., randomly, based on data received from the mobile device 110, etc.). The account applications 151 may include on-demand applications that can be dynamically downloaded and installed on the mobile device 110. As shown, the account applications 151 include instant applications 152 and progressive web applications 153. An instant application is a non-persistent application that may be dynamically downloaded and installed on the mobile device 110. One example of an instant application 152 is an Android® instant application. The instant application 152 is an on-demand application that may immediately be installed and executed on the mobile device 110 when the download is complete. Furthermore, instant applications 152 correspond to a subset of an application that is chosen based on a particular function to be performed, while the remainder of the application can be downloaded later (or as part of a background process). For example, the instant applications 152 may be a subset of an overall account management application that performs a variety of functions, while the instant applications 152 comprise one or more portions of the account management application and/or a subset of functions provided by the account management application.

Generally, progressive web applications are on-demand applications that execute in the web browser 115 and remain persistent when executing on the mobile device 110. For example, progressive web applications are allocated storage of the mobile device 110 and can be updated in the background when new functionality is added to the progressive web application. One example of a progressive web application 153 is an Android progressive web application. As stated, progressive web applications 153 may be dynamically downloaded and executed in the web browser 115 automatically when the download is complete. The progressive web applications 153 correspond to a subset of an application that is chosen based on a particular function to be performed. For example, the progressive web applications 153 may be a subset of an overall account management application that performs a variety of functions, while the progressive web applications 153 comprise one or more portions of the account management application and/or a subset of functions provided by the account management application.

In some embodiments, the account applications 151 include one or more portions (or segments) of another application (e.g., the account management application, etc.). Therefore, stated differently, the account applications 151 may include a subset (or all) of the pages and/or functionality of the other application. For example, a first account application 151 may include a page that allows customers to view their bank account balance and a page that allows customers to send emails to customer service while excluding other functionality provided by the complete account management application (e.g., payment scheduling, loan requests, etc.). Advantageously, the first account application 151 is able to perform the associated functions without requiring the bank's account management application to be pre-installed on the mobile device 110. More generally, the account applications 151 may collectively be considered as a cloud-based "application bundle" that can be accessed, and a subset of that bundle can be quickly downloaded to the mobile device 110. Therefore, the application bundle may collectively include all functionality provided by the account management application, but only a subset of the account applications 151 required to perform one or more needed operations are downloaded to the mobile device 110.

The URL 106 generated by the applet 103 may further include encrypted data 105 as parameters. As described in greater detail below, the encrypted data 105 may be used by the authentication server 120 to validate the data generated by the contactless card 101. For example, the applet 103 of the contactless card 101 may use a cryptographic algorithm to generate a cryptographic payload of encrypted data 105 based at least in part on the private key 104 stored in the memory 102 of the contactless card 101. In such an embodiment, the private key 104 and some other piece of data (e.g., a customer identifier, account identifier, etc.) may be provided as the input to the cryptographic algorithm, which outputs the encrypted data 105. Generally, the applet 103 may use any type of cryptographic algorithm and/or system to generate the encrypted data 105, and the use of a specific cryptographic algorithm as an example herein should not be considered limiting of the disclosure. In some embodiments, the applet 103 may perform encryption using a key diversification technique to generate the cryptographic payload. Examples of key diversification techniques are described in U.S. patent application Ser. No. 16/205,119, filed Nov. 29, 2018. The aforementioned patent application is incorporated by reference herein in its entirety.

As stated, the applet 103 of the contactless card 101 may include the encrypted data 105 as a parameter of the URL 106, thereby generating a URL with encrypted data 108. For example, if the URL to the application server 150 and/or an account application 151 is "http://www.example.com/accountapp" and the encrypted data 105 is "ABC123", the URL with encrypted data 108 may be "http://www.example.com/accountapp?data=ABC123". In some embodiments, the applet 103 may encode the encrypted data 105 according to an encoding format compatible with URLs prior to including the encrypted data 105 as a parameter of the URL 106. For example, the encrypted data 105 may be a string of binary data (e.g., zeroes and ones), which may not be compatible with URLs. Therefore, the applet 103 may encode the encrypted data 105 to the American Standard Code for Information Interchange (ASCII) base64 encoding format. Doing so represents the binary encrypted data 105 in an ASCII string format by translating it into a radix-64 representation (e.g., "ABC123" in the previous example). Further still, the URL 106 may include an indication of which page of the application 151 to open upon installation. Continuing with the previous example, a page identifier of "1" (or other page identifier, such as a page name, etc.) may be added as a parameter to the URL 106, and the URL with encrypted data 108 may be "http://www.example.com/accountapp?data=ABC 123&p=1".

Once generated, the applet 103 may transmit the URL with encrypted data 108 to the mobile device 110, e.g., via NFC. In one embodiment, when received by the OS 112, the OS 112 causes the web browser 115 to access the URL with encrypted data 108. Doing so causes information describing the mobile device 110 to be sent with the request to access the URL with encrypted data 108. For example, the information may include attributes of the mobile device 110, such as operating system version, hardware capabilities, and software capabilities. In response, the application server 150 may transmit the account application 151 associated with the URL with encrypted data 108 to the mobile device 110. In some embodiments, the application server 150 selects an account application 151 based on the received attributes of the mobile device 110. For example, if the OS 112 of the mobile device 110 does not support progressive web applications 153, the application server 150 may select the corresponding instant application 152 as the account application 151. In some embodiments, if the application server 150 selects an instant application 152 as the account application 151, the application server 150 may cause the mobile device 110 to open an application store application (e.g., one of the other applications 116) to download the instant application 152. Examples of application stores include the Google® Play store, the Apple® App Store, the Amazon® Appstore, etc.

In some embodiments, when the OS 112 receives the URL with encrypted data 108, the URL is directed to an instant application 152. In some such embodiments, the instant application 152 is downloaded through an application store. Therefore, instead of opening the web browser 115, the OS 112 opens the corresponding application store application 116. In some embodiments, the application store application 116 is opened in the background of the OS 112 without opening the application store application 116 in the foreground of the OS 112. In such embodiments, the instant application 152 is downloaded in the background of the OS 112. Regardless of whether occurring in the foreground or the background of the OS 112, the application store application 116 downloads, installs, and executes the instant application 152. However, in some embodiments, such instant applications 152 may be downloaded using the web browser 115, regardless of where the instant applications 152 are stored.

In addition and/or alternatively, the application server 150 may select the account application 151 based on the portions of an application required to perform a given function. For example, the application server 151 may determine, based on the encrypted data 105 in the URL with encrypted data 108, that the functions include one or more of extracting the encrypted data 105, decoding the encrypted data 105, transmitting the decoded encrypted data 105 to the authentication server 120, receiving the virtual card data 126 from the VAN generator 142, and providing the virtual card data 126 to the autofill service 114. Therefore, the application server 150 may select one or more account applications 151 that include functionality required to perform the stated functions. For example, the application server 150 may select one or more instant applications 152 that include functionality to extract the encrypted data 105, decode the encrypted data 105, transmit the decoded encrypted data 105 to the authentication server 120, receive the virtual card data 126 from the VAN generator 142, and provide the virtual card data 126 to the autofill service 114. In some embodiments, the application server 150 may transmit additional portions of the application to the mobile device 110 (e.g., as part of a background download).

Similarly, the application server 150 may select one or more progressive web applications 153 based on the portions of an application required to perform a given function. For example, the progressive web applications 153 may be optimized for a given task and/or function. As another example, the progressive web applications 153 may include a subset of a core progressive web application 153 that perform the required functions (and/or additional functions). The core progressive web application 153 may include the complete functionality of the account management application. Therefore, continuing with the previous example, the application server 150 may select one or more progressive web applications 153 that are optimized to extract the encrypted data 105, decode the encrypted data 105, transmit the decoded encrypted data 105 to the authentication server 120, receive the virtual card data 126 from the VAN generator 142, and provide the virtual card data 126 to the autofill service 114. Similarly, the application server 150 may select the subset of the core progressive web application 153, where the subset includes functionality to extract the encrypted data 105, decode the encrypted data 105, transmit the decoded encrypted data 105 to the authentication server 120, receive the virtual card data 126 from the VAN generator 142, and provide the virtual card data 126 to the autofill service 114.

Figure 1B:
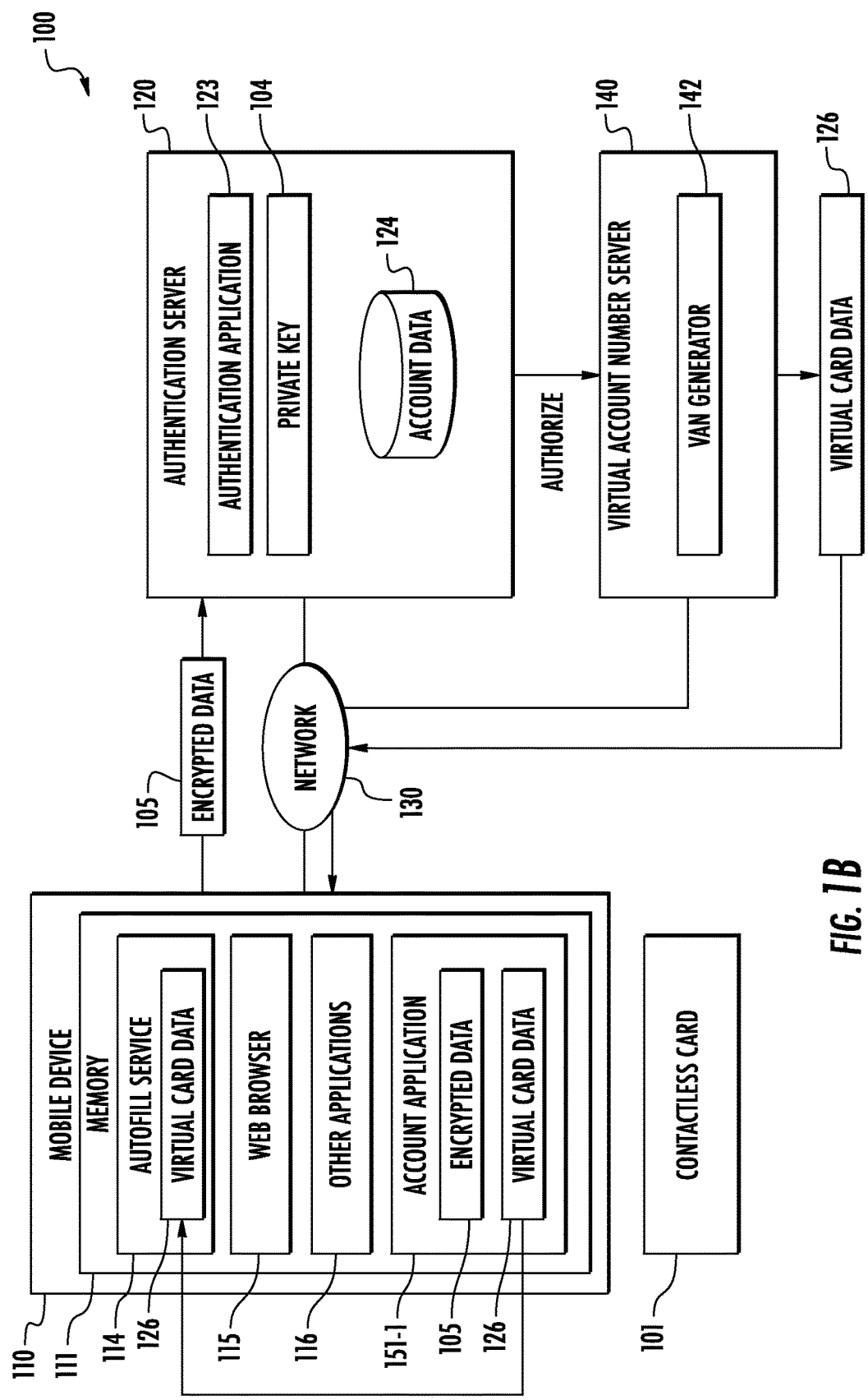

FIG. 1B depicts an embodiment where an example account application 151-1 has been dynamically downloaded and installed in the memory 111 of the mobile device 110. The account application 151 may be an instant application 152 and/or a progressive web application 153. In FIG. 1B, some elements of FIG. 1A are not depicted for the sake of clarity. As stated, the account application 151-1 may be selected by the application server 150 based on one or more required functions, the functions performed by the account application 151-1, and/or the parameters of the mobile device 110. Although depicted as executing in the memory 111 (e.g., as an instant application 152), if the account application 151-1 is a progressive web application 153, the progressive web application 153 instance of the account application 151-1 may execute in the web browser 115. In one embodiment where the account application 151-1 is a progressive web application 153, the progressive web application 153 may determine to download and install an instant application 152 from the application server 150 on the mobile device 110.

Furthermore, regardless of whether the account application 151-1 is an instant application 152 or a progressive web application 153, the account application 151-1 includes pages or functionality sufficient perform the required functionality (e.g., the functionality described herein). More specifically, once downloaded to the mobile device 110, the account application 151-1 may open one or more pages (e.g., pages specified by one or more parameters of the URL 106) that receive the URL with encrypted data 108 as input, extract the encrypted data 105 from the URL with encrypted data 108, and transmit the encrypted data 105 to the authentication server 120 via the network 130. Furthermore, the account application 151-1 may convert the encrypted data 105 to the original encoding format (e.g., from ASCII base64 to binary) prior to transmitting the binary encrypted data 105 to the authentication server 120. As described in greater detail below, the account application 151-1 may receive virtual card data 126 from the VAN generator 142 and provide the virtual card data 126 to the autofill service 114.

Once received, the authentication application 123 may then authenticate the encrypted data 105. For example, the authentication application 123 may attempt to decrypt the encrypted data 105 using a copy of the private key 104 stored in the memory 122 of the authentication server 120. The private key 104 may be identical to the private key 104 stored in the memory 102 of the contactless card 101, where each contactless card 101 is manufactured to include a unique private key 104 (and the authentication server 120 stores a corresponding copy of each unique private key 104). Therefore, the authentication application 123 may successfully decrypt the encrypted data 105, thereby verifying the encrypted data 105. For example, as stated, a customer identifier may be used to generate the encrypted data 105. In such an example, the authentication application 123 may decrypt the encrypted data 105 using the private key 104 of the authentication server 120. If the result of the decryption yields the customer identifier associated with the account in the account data 124, the authentication application 123 verifies the encrypted data 105, and instructs the VAN generator 142 to generate virtual card data 126 for the account associated with the contactless card 101. If the authentication application 123 is unable to decrypt the encrypted data to yield the expected result (e.g., the customer identifier of the account associated with the contactless card 101), the authentication application 123 does not validate the encrypted data 105. Due to the failed verification, the authentication application 123 does not instruct the VAN generator 142 to generate virtual card data 126 to preserve the security of the associated account.

The embodiment depicted in FIG. 1B reflects where the authentication application 123 validates the encrypted data 105 and instructs the virtual account number (VAN) generator 142 in the memory 141 of the virtual account number server 140 to generate virtual card data 126. The virtual card data 126 may comprise a virtual account number, expiration date, and/or CVV for the account associated with the contactless card 101. In some embodiments, the VAN generator 142 generates the virtual account number, the expiration date, and the CVV. In other embodiments, the VAN generator 142 generates the virtual account number and selects an existing expiration date and/or CVV (e.g., from the account data 124). For example, the existing expiration date and/or CVV may be the expiration date and/or CVV of the contactless card 101, or another card associated with the account in the account data 124. The card data 126 may further include the name of the account holder and one or more known addresses associated with the contactless card 101.

In at least one embodiment, the card data 126 including the virtual account number generated by the VAN generator 142 is restricted to a specific merchant or group of merchants. The virtual account number and/or card data 126 may further include other restrictions (e.g., time restrictions, amount restrictions, etc.). Once generated, the VAN generator 142 may transmit the virtual card data 126 to the account application 151-1 executing on the mobile device 110. The VAN generator 142 may provide the virtual card data 126 to the account application 151-1 via any suitable method, such as a push notification, text message, email, one or more data packets, etc.

Once received by the account application 151-1, the account application 151-1 may provide the virtual account number, the expiration date, CVV, address of the virtual card data 126 to the autofill service 114 of the OS 112, e.g., via an application programming interface (API) of the autofill service 114. Therefore, the account application 151-1 further includes functionality to receive the virtual card data 126 and provide the virtual card data 126 to the autofill service 114. As illustrated in FIG. 1B, the autofill service 114 now stores the virtual card data 126, including a virtual account number, expiration date, and CVV. As stated, the virtual card data 126 may further include an account holder name, billing address, and/or shipping address. Doing so allows the autofill service 114 to inject the virtual card data 126 into the forms 127, 129 of the web browser 115 and other applications 116, respectively.

Figure 1C:
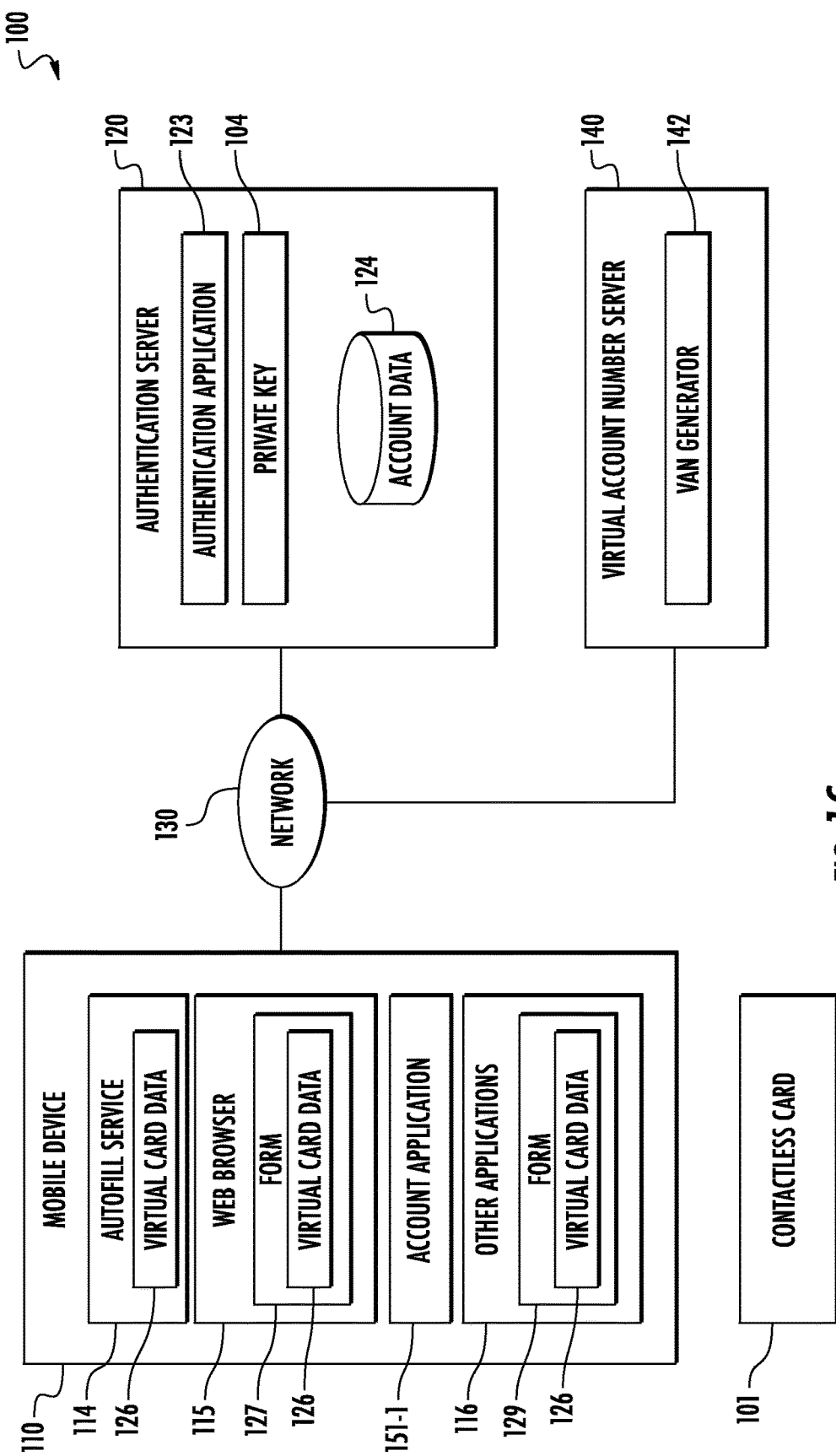

FIG. 1C depicts an embodiment where the autofill service 114 automatically fills the virtual card data 126 to the form 127 in the web browser 115 and the form 129 of the other applications 116. As described in greater detail with reference to FIGS. 2A-2D, the autofill service 114 may autofill each element of the virtual card data 126 to a corresponding field of the forms 127, 129. In at least one embodiment, a user may be prompted to approve the autofill of the virtual card data 126 to the forms 127, 129.

Figure 2B:
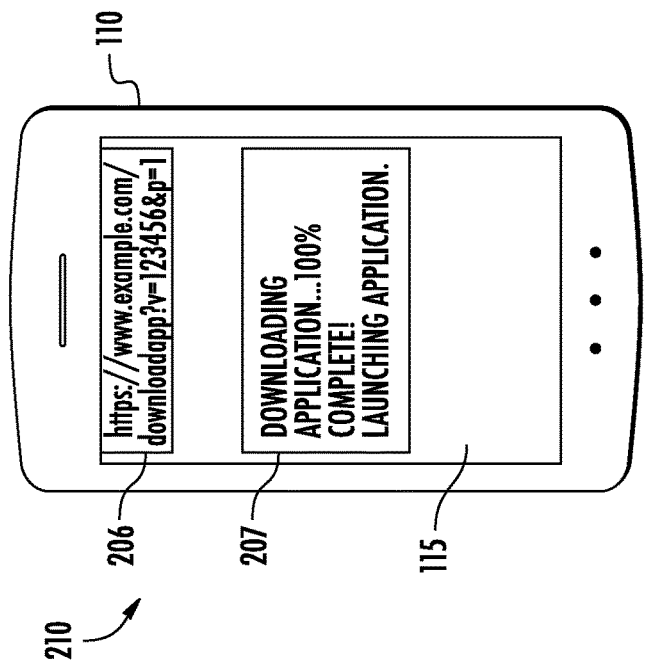
FIGS. 2A-2D illustrate embodiments of tapping a contactless card to a computing device to securely generate virtual card numbers which can be autofilled in form fields.
Figure 2A:
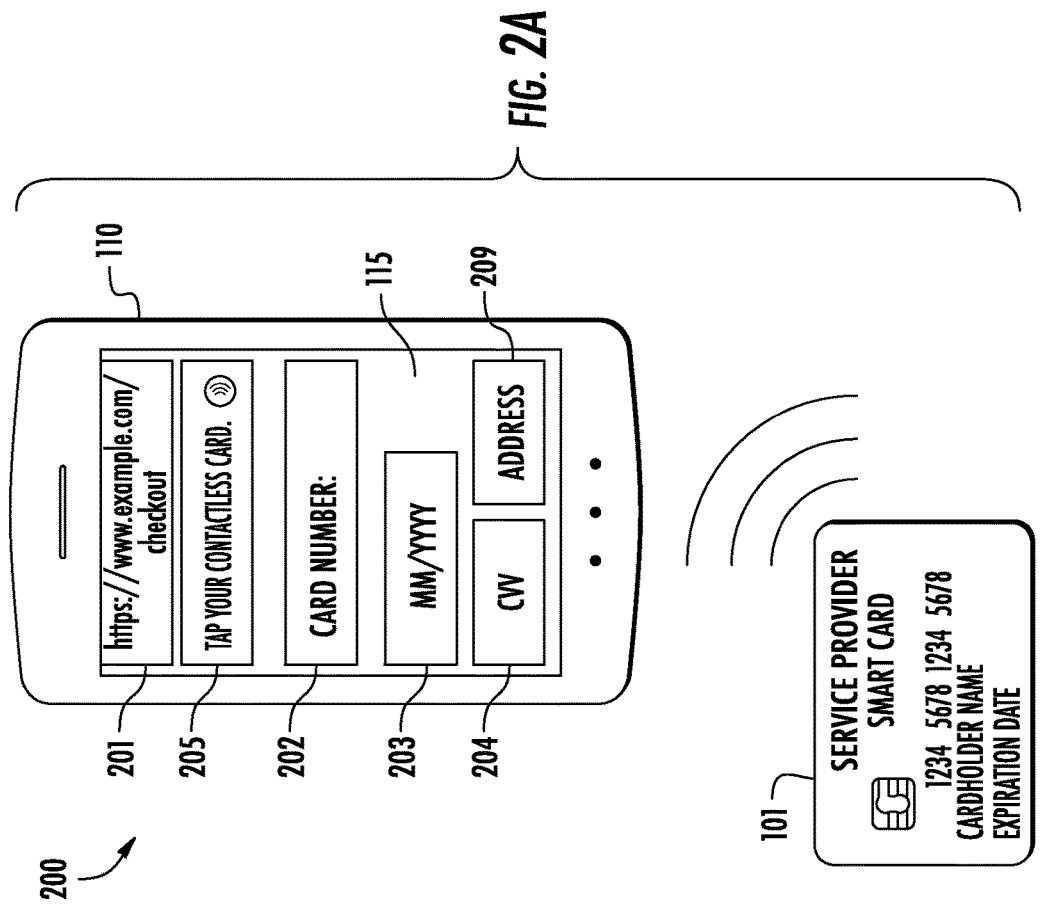

FIG. 2A is a schematic 200 depicting an example embodiment of tapping the contactless card 101 to generate virtual card data to fill into an example form using the autofill service 114. As shown, the web browser 115 outputs a page at a URL 201. The page at the URL 201 includes a form with form fields 202-204 and 209 (e.g., a payment form), where field 202 corresponds to an account number field, field 203 corresponds to an expiration date field, field 204 corresponds to a CVV field, and field 209 corresponds to an address field. The address field 209 may be a billing address and/or a shipping address. The form may include additional elements not depicted for the sake of clarity. As shown, a notification 205 is outputted by the OS 112 and/or a different service (if installed). The notification 205 instructs the user to tap the contactless card 101 to the mobile device 110. In one embodiment, the user selects the notification 205 prior to tapping the contactless card 101 to the mobile device 110. However, in some embodiments, the notification 205 is not outputted, and the user taps the contactless card 101 to the mobile device 110 without instructions from the notification 205.

In one example, the OS 112 outputs the notification 205 when the account number field 202 (or another field) receives focus (e.g., is selected by the user). To determine that a field has received focus, the OS 112 may analyze a hypertext markup language (HTML) attribute of the account number field 202 to determine that the account number field 202 has received focus. As another example, the OS 112 outputs the notification 205 upon determining that the form includes one or more payment fields. Furthermore, the OS 112 may analyze the metadata of the account number field 202 to determine that the field 202 is associated with the account number. For example, the OS 112 may determine, based on the metadata, that the account number field 202 is configured to receive 16 characters as input. As another example, the metadata may specify a name for the form field 202 that is similar to names associated with account number fields (e.g., "accountnumber", "account number", etc.). As another example, the metadata of a form field may specify that the form field is associated with the account number field, expiration date field, CVV field, shipping address field, and/or billing address field. Therefore, the OS 112 may output the notification 205 to tap the contactless card 101 to the mobile device 110 based on automatically determining that the form includes one or more payment fields and/or based on determining that the payment field has received focus.

As stated, once the contactless card 101 is tapped to the mobile device 110, the OS 112 transmits, via the card reader 119 (e.g., via NFC, Bluetooth, RFID, and/or the EMV protocol, etc.), an indication to the communications interface 107 of the contactless card 101. The indication may specify to generate a URL with encrypted data. As stated, the applet 103 may generate the encrypted data using data (e.g., a customer identifier) and the private key 104 of the contactless card as input to a cryptographic algorithm to generate encrypted data 105. The applet 103 may encode the encrypted data 105 into an encoding format compatible with URLs. The applet 103 may then select a URL 106 and include the encoded encrypted data 105 as a parameter of the URL 106. The applet 103 may further add indications of one or more pages of the account application 151 as parameters to the URL. Doing so ensures that the account application 151 opens to the correct page upon execution by receiving the URL as input (e.g., as "oncreate" input provided to the account application 151 upon execution). The applet 103 may then transmit the URL with encrypted data to the mobile device 110 via the communications interface 107.

FIG. 2B is a schematic 210 depicting an embodiment where the OS 112 of the mobile device 110 receives the URL with encrypted data generated by the contactless card 101. As shown, the OS 112 has caused the web browser 115 to open an example URL 206 that is directed to the application server 150. In embodiments, where the payment form fields 202-204 are in one of the other applications 116, the OS 112 opens the web browser 115 and causes the web browser 115 to access the URL 206. The application server 150 may then receive the request and initiate transmission of the account application 151 associated with the URL 206. As stated, the account application 151 may be an instant application 152, a progressive web application 153, or any other application that is not pre-installed on the mobile device 110. Generally, the application server 150 selects the account application 151 based on the required functionality and the functionality performed by the account application 151. In some embodiments, the application server 150 selects the account application 151 based on attributes describing the mobile device 110 received with the URL 206. For example, if the OS 112 of the mobile device 110 does not support instant applications 152 but supports progressive web applications 153, the application server 150 may transmit an account application 151 that is a progressive web application 153 to the mobile device 110. Other example attributes describing the mobile device 110 include detected versions of software installed in the OS 112, the speed of a network connection of the mobile device 110, remaining battery life of the mobile device 110, etc. Therefore, for example, if the mobile device 110 has a slow network connection and/or little remaining battery life, the application server 150 may select the account application 151 having the smallest size that can perform the required functions.

Figure 2D:
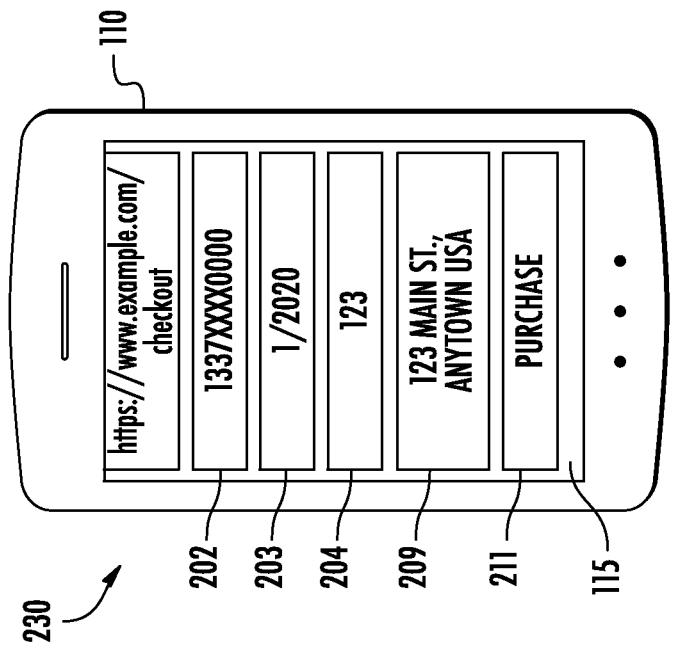
Figure 2C:
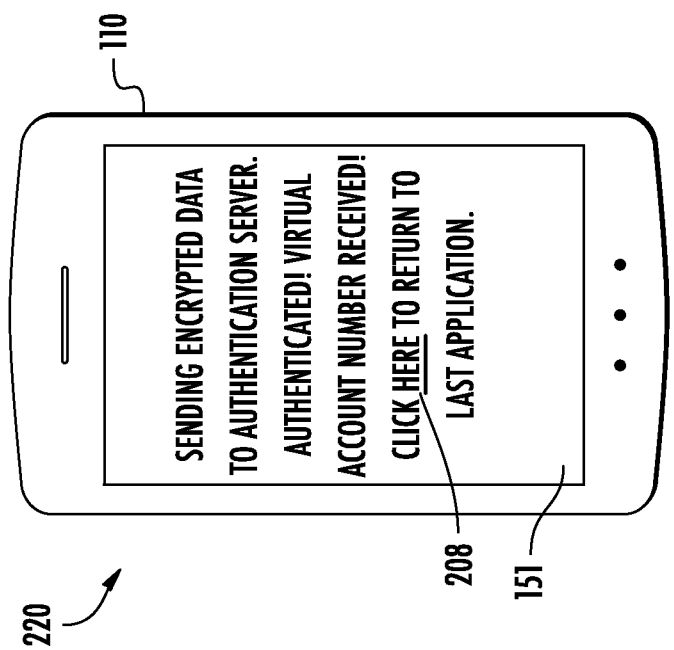

FIG. 2C is a schematic 220 depicting an embodiment where an instant application 152 version of the account application 151 is downloaded and installed on the mobile device 110. As shown, the account application 151 opens a page reflecting that the encrypted data 105 has been extracted and decoded from the URL 206. The page of the account application 151 is opened based on the parameter "p=1" in the URL 206. The account application 151 may then transmit the extracted and decoded encrypted data 105 to the authentication server 120 for authentication. As shown, the authentication server 120 authenticates the encrypted data 105 and instructs the VAN generator 142 to generate a virtual card number, expiration date, and CVV. The VAN generator 142 then transmits the generated data to the account application 151, which outputs a URL 208 that redirects to the previous application (e.g., the web browser 115 and/or the other applications 116) with the payment form. Other graphical objects may be used instead of the link 208, and the use of the link 208 should not be considered limiting of the disclosure.

FIG. 2D is a schematic 230 depicting an embodiment where the user has selected the link 208 in the account application 151 to return to the web browser 115. As shown, the autofill service 114 has autofilled example data to the form fields 202-204 in the web browser 115. More specifically, the autofill service 114 has autofilled a virtual account number to the form field 202, an expiration date to the form field 203, a CVV to form field 204, and the account holder's address to form field 209. Once autofilled, the user may select the purchase button 211 to process the payment for a purchase. Advantageously, the data is autofilled to the form fields without requiring the user to manually enter the data and without requiring a dedicated application to autofill the data to be pre-installed on the device 110. In some embodiments, the autofill service 114 may output a notification to the user (not pictured) that must be selected prior to autofilling the data to the form fields 202-204 and 209.

In some embodiments, the autofill service 114 detects a form field (e.g., the form fields 202-204, 209), detects content in a notification (e.g., a text message notification) that has a type which matches the type of the detected form field, and offers the content parsed from the notification into an autofill suggestion in the keyboard. Doing so allows the autofill service 114 to automatically fill the data from the notification to the corresponding form fields.

Figure 3:
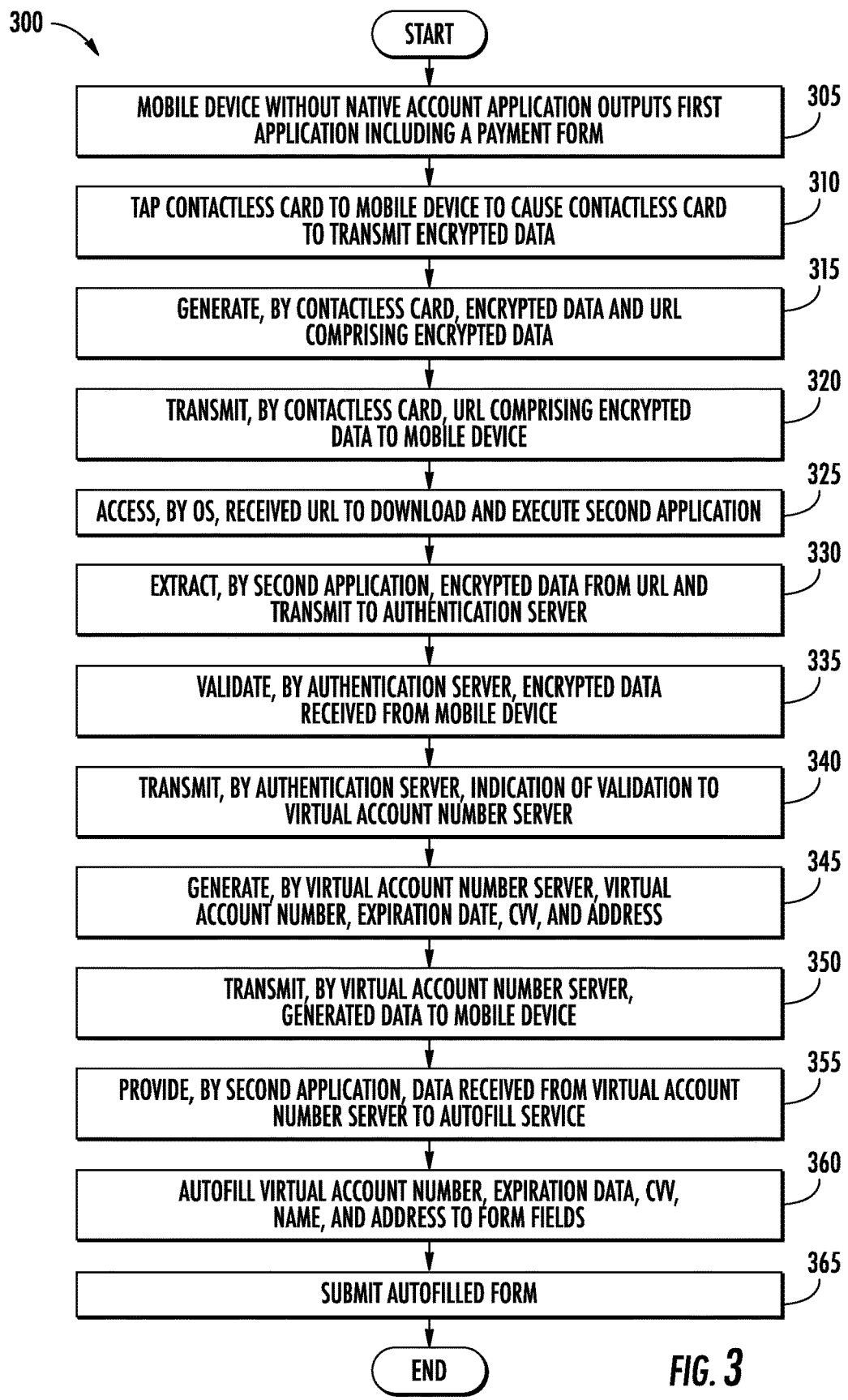
FIG. 3 illustrates an embodiment of a first logic flow.

FIG. 3 illustrates an embodiment of a logic flow 300. The logic flow 300 may be representative of some or all of the operations executed by one or more embodiments described herein. For example, the logic flow 300 may include some or all of the operations to use a contactless card to generate a virtual card data and autofill the virtual account number to a form using the autofill service 114. Embodiments are not limited in this context.

As shown, the logic flow 300 begins at block 305, where a mobile device 110 that does not include an installed account management application outputs a first application that includes a payment form with payment fields. The first application may be the web browser 115 including a form 127 and/or one of the other applications 116 including a form 129. The payment fields may include one or more of an account number field, expiration date field, a CVV field, one or more name fields, and one or more address fields (e.g., billing address, shipping address, etc.). For example, the OS 112 may analyze the metadata of the form fields to determine that one or more of the fields is associated with an account number, expiration date, CVV, billing address, etc. As another example, the OS 112 may determine, based on the metadata, that a field is configured to receive 16 characters as input.

In some embodiments, a user may tap the payment field of a form in the web browser 115 to give one of the payment fields focus. For example, a user may tap the payment field of the form to give the payment field focus. As another example, the user may select the payment field of the form using a mouse and/or keyboard. More generally, any technique may be used to give the payment field focus, including programmatically generated focus. For example, the payment field may receive focus based on the HTML "focus( )" method. As another example, the payment field may automatically receive focus when the form is loaded, e.g., based on the "autofocus" HTML attribute being applied to the payment field in source code. Once the payment field receives focus, the account application 113 and/or the OS 112 may output a notification specifying to the user to tap the contactless card 101 to the mobile device 110.

At block 310, a user taps the contactless card 101 to the mobile device 110 to cause the contactless card 101 to generate and transmit encrypted data as part of a URL to the application server 150 and/or one of the account applications 151. The OS 112 may transmit an indication to the contactless card 101 via the NFC card reader 119 specifying to generate and transmit encrypted data as part of the URL.

At block 315, the applet 103 of the contactless card generates the encrypted data using the private key 104, input data (e.g., a customer identifier), and a cryptographic algorithm. The applet 103 may then include the encrypted data as a parameter of a URL. The applet 103 may further encode the encrypted data prior to appending the encoded encrypted data as a parameter of the URL. Furthermore, the URL may be a universal link URL which has a parameter specifying an identifier of one or more pages of the account application 151 to be opened when downloaded. Further still, the URL may identify a portion of the instant application 152 and/or progressive web application 153 that needs to be downloaded first. Doing so allows the identified pages to be opened when the application 151 is downloaded to be downloaded first, while other pages that are not immediately opened are downloaded later.

At block 320, the applet 103 may transmit the URL including the encrypted data to the mobile device 110. At block 325, the OS 112 directs the web browser 115 to access the URL received from the contactless card 101 to dynamically download and install (and/or execute) a second application (e.g., one of the account applications 151), where the second application is an instant application 152 and/or a progressive web application 153. The application server 150 may then select and transmit one or more of the account applications 151 to the mobile device 110. As stated, in accessing the URL received from the contactless card 101, the web browser 115 may transmit information describing the mobile device 110 (e.g., an indication of the type of web browser 115, a version of the web browser, a type of the OS 112, and a version of the OS 112, etc.). Therefore, the application server 150 may select the account application 151 based on the types of applications supported by the mobile device 110. Further still, the application server 150 may select the account application 151 based on the types of functions that the account applications 151 must be configured to perform. Once received, the OS 112 executes the received account application 151. For example, the OS 112 may load the progressive web application 153 in the web browser 115. As another example, the OS 112 may execute the instant application. Regardless of the type of the account application 151, the OS 112 receives the URL with encrypted data from the application server 150 and provides the URL with encrypted data to the application as input.

At block 330, the account application 151 extracts the encrypted data from the URL and transmits the encrypted data to the authentication application 123 of the authentication server 120 for verification. As stated, in some embodiments, the account application 151 may decode the encrypted data before transmitting the encrypted data to the authentication server 120. At block 335, the authentication application 123 decrypts the encrypted data using the private key in the memory of the authentication server 120 to validate the encrypted data. At block 340, the authentication application 123 transmits an indication to the VAN generator 142 specifying to generate card data comprising a virtual account number, expiration date, and CVV. At block 345, the VAN generator 142 generates the virtual account number, expiration date, and CVV. At block 350, the VAN generator 142 transmits the virtual account number, expiration date, and CVV to the mobile device 110. The VAN generator 142 may further include the name, billing address, and shipping address of the account holder, which may be stored locally by the VAN generator 142 and/or received from the authentication server 120.

At block 355, the second application (e.g., the downloaded account application 151) provides the received data to the autofill service 114 of the OS 112. Furthermore, the user may return to the first application (e.g., the web browser 115 and/or other application 116). At block 360, The autofill service may then autofill the virtual account number, expiration date, CVV, name, and addresses stored in the autofill service 114 to the payment fields of the form. At block 365, the user submits the autofilled form including the card data generated by the VAN generator 142. For example, the submission of the form may update payment information (e.g., in the user's account), complete a purchase, etc. Advantageously, the form is autofilled and the purchase may be completed without requiring an account management application (or other application that communicates with the contactless card 101 and/or the authentication server 120) to be pre-installed on the device.

Figure 4:
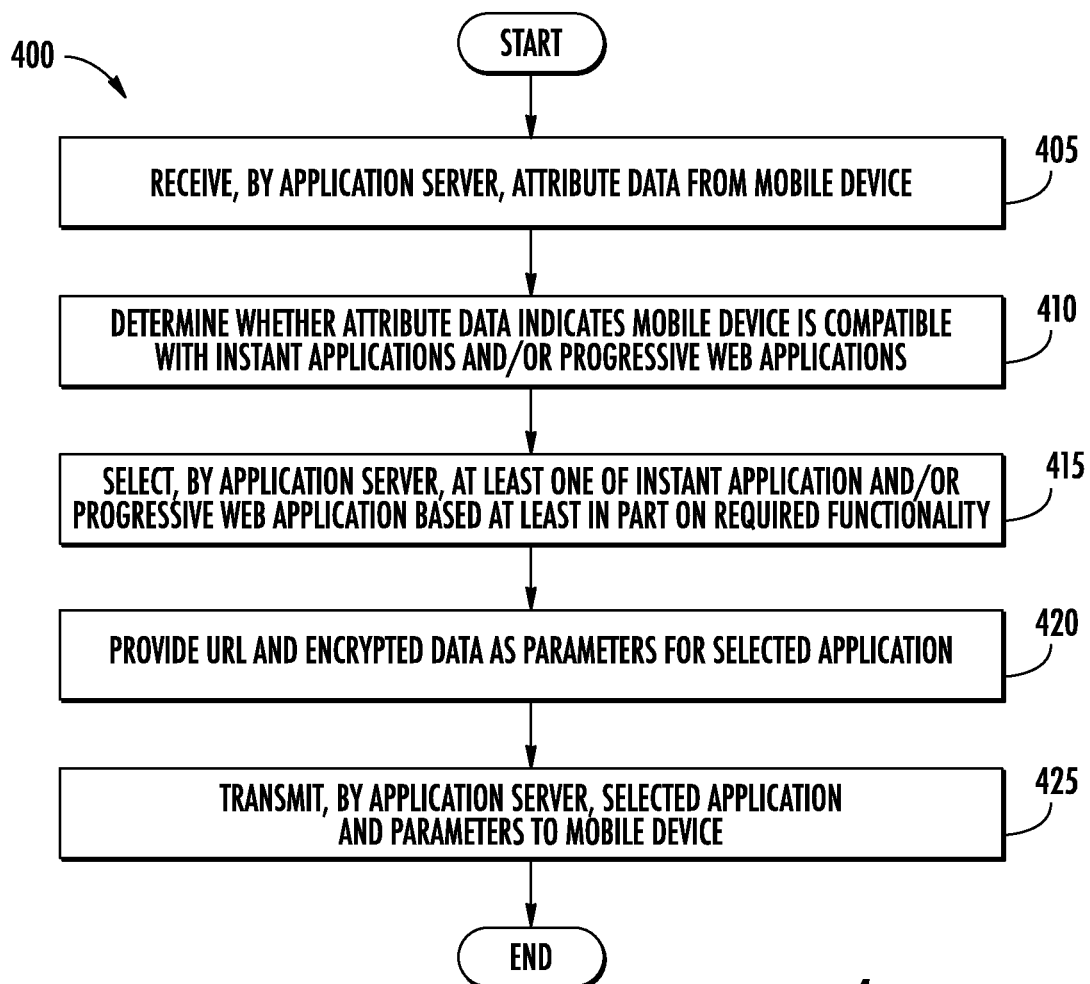
FIG. 4 illustrates an embodiment of a second logic flow.

FIG. 4 illustrates an embodiment of a logic flow 400. The logic flow 400 may be representative of some or all of the operations executed by one or more embodiments described herein. For example, the logic flow 500 may include some or all of the operations performed by the application server 150 to select an account application 151 to transmit to the mobile device 110. Embodiments are not limited in this context.

As shown, the logic flow 400 begins at block 405, where the application server 150 receives attribute data from the mobile device 110. Generally, when following the URL generated by the contactless card 101, the web browser 115 includes data describing the mobile device 110 in a hypertext transfer protocol (HTTP) request. The application server 150 may analyze the received data to determine, e.g., the type of mobile device 110, type and/or version of the OS 112, type and/or version of the web browser 115, etc. At block 10, the application server 150 determines, based on the attribute data of the mobile device 110, whether the mobile device 110 is compatible with instant applications 152 and/or progressive web applications 153. For example, instant applications 152 may require a specific type and version of OS for compatibility, while progressive web applications 153 may require a specific type and version of OS and web browser for compatibility. The device attributes indicate whether the mobile device 110 meets these requirements.

At block 415, the application server 150 selects one or more of the instant applications 152 and/or progressive web applications 153 based on the determinations made at block 410. For example, if the mobile device 110 is compatible with instant applications, the application server 150 may select an instant application 152 as the account application 151. Furthermore, as stated, the application server 150 selects one or more of the instant applications 152 and/or progressive web applications 153 based on the required functionality to be performed on the mobile device 110 (e.g., extracting encrypted data, transmitting encrypted data to the authentication server, receiving virtual card data from the VAN generator 142, and providing the received virtual card data to the autofill service 114). At block 420, the application server 150 provides the URL generated by the contactless card 101 as parameters for the download of the account application 151 selected at block 415. At block 425, the application server 150 transmits the selected account application 151 and the URL to the mobile device 110. Doing so causes the selected application to be dynamically downloaded and installed on the mobile device 110.

Figure 5:
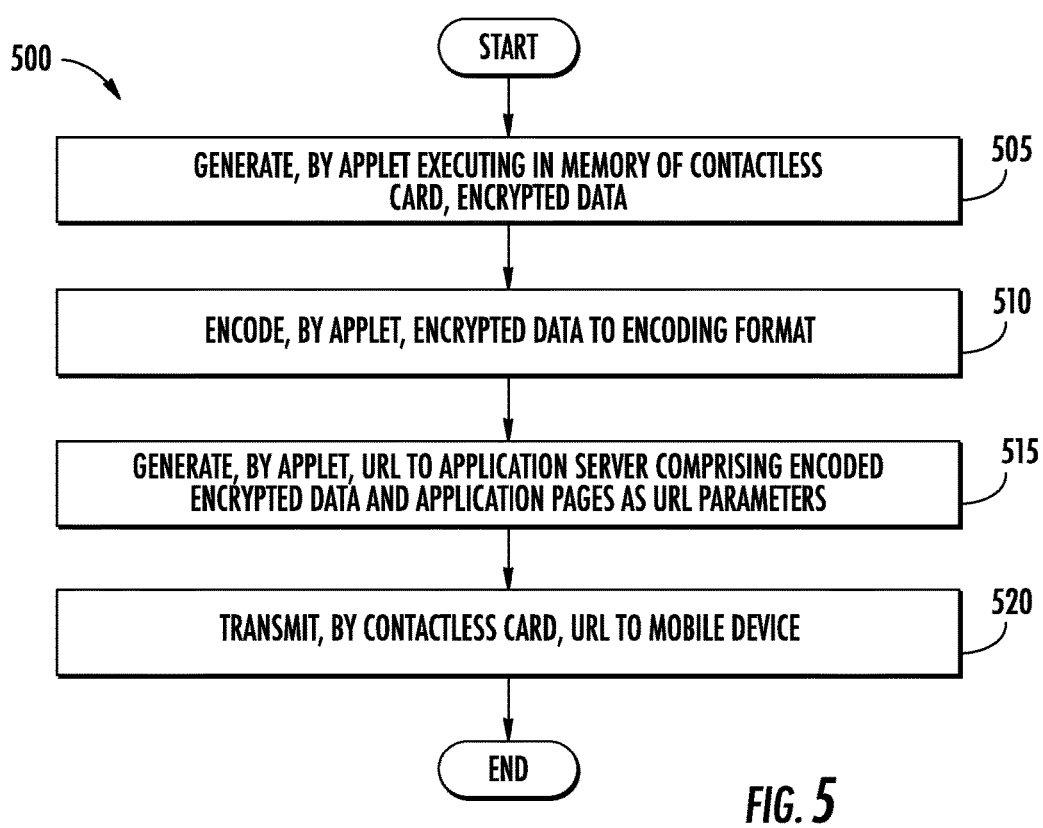
FIG. 5 illustrates an embodiment of a third logic flow.

FIG. 5 illustrates an embodiment of a logic flow 500. The logic flow 500 may be representative of some or all of the operations executed by one or more embodiments described herein. For example, the logic flow 500 may include some or all of the operations performed by the contactless card 101 to generate a URL with encrypted data 108. Embodiments are not limited in this context.

As shown, the logic flow 500 begins at block 505, where the applet 103 of the contactless card generates the encrypted data 105. As stated, the encrypted data 105 is the output of a cryptographic algorithm based on the private key 104 and input data (e.g., a customer identifier). At block 510, the applet 103 encodes the encrypted data 105 according to an encoding format (e.g., ASCII base64). At block 515, the applet 103 generates a URL comprising the encoded encrypted data and one or more application pages of the target account application 151 as parameters. The URL may be directed to the application server 150 and/or one or more of the account applications 151. At block 520, the contactless card 101 transmits the URL generated at block 515 to the mobile device 110. Upon receiving the URL, the OS 112 causes the web browser 115 to access the URL. Doing so may cause an account application 151 to be dynamically downloaded and installed on the mobile device 110.

Figure 6:
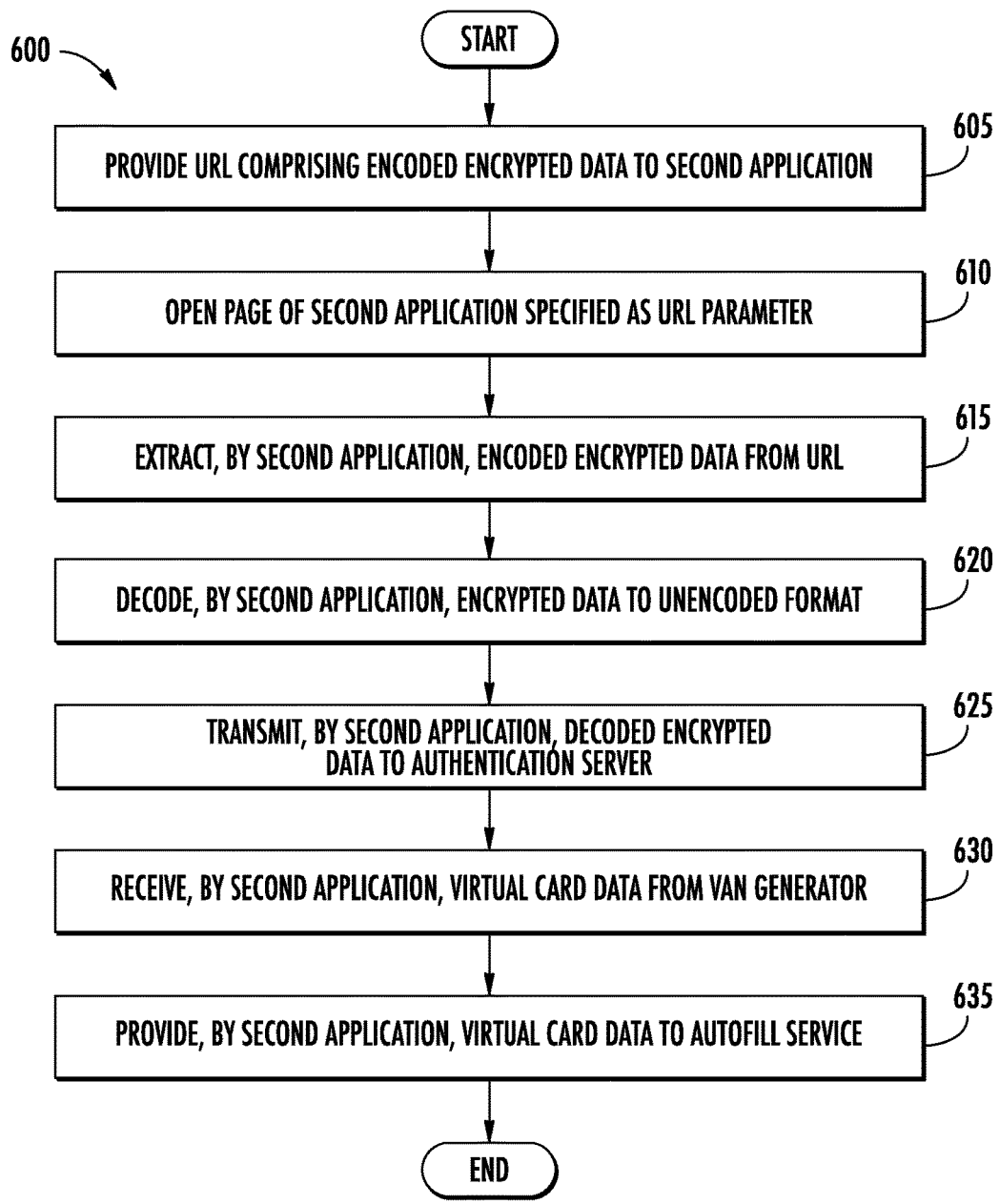
FIG. 6 illustrates an embodiment of a fourth logic flow.

FIG. 6 illustrates an embodiment of a logic flow 600. The logic flow 600 may be representative of some or all of the operations executed by one or more embodiments described herein. For example, the logic flow 600 may include some or all of the operations performed by the account application 151 executing on the mobile device 110. Embodiments are not limited in this context.

As shown, the logic flow 600 begins at block 605, where the second application of FIG. 3 (e.g., the account application 151) receives the URL comprising encoded encrypted data as input. At block 610, the account application 151 opens a page of the account application 151 specified in the URL. For example, the account application 151 may open one or more pages configured to extract the encoded encrypted data from the URL, decode the encrypted data, transmit the encrypted data to the authentication server, receive the virtual card data from the VAN generator 142, and provide the received virtual card data to the autofill service 114. As stated, the account application 151 may be an instant application 152 and/or a progressive web application 153.

At block 615, account application 151 extracts the encoded encrypted data from the URL, e.g., based on a parameter name in the URL. At block 620, account application 151 decodes the encrypted data to an unencoded format (e.g., binary). At block 625, the account application 151 transmits the decoded encrypted data to the authentication server 120. At block 630, the account application 151 receives virtual card data (e.g., one or more of a virtual card number, expiration date, CVV, name, billing address, and shipping address) from the VAN generator 142. At block 635, the account application 151 provides the virtual card data to the autofill service 114.

Figure 7:
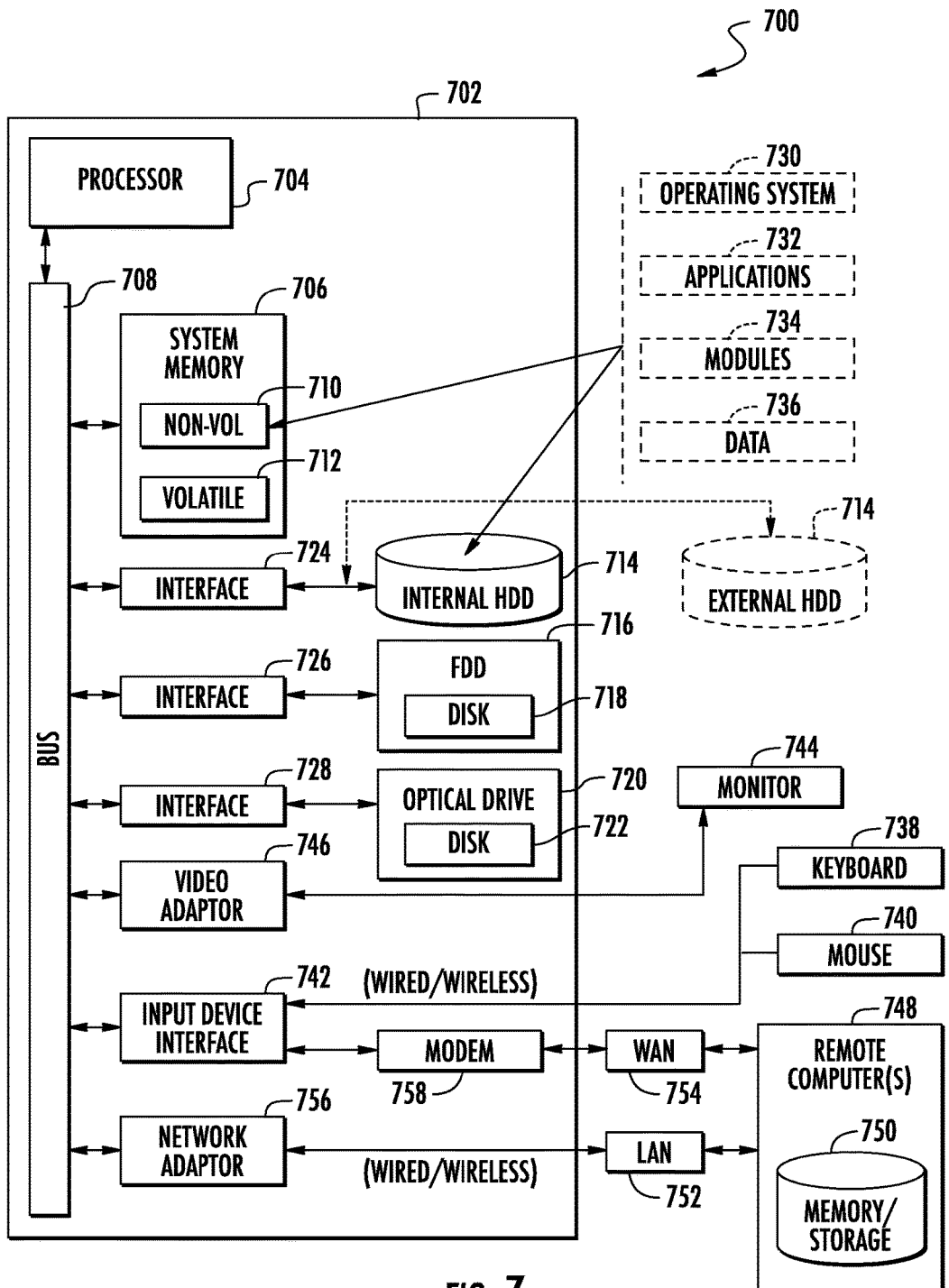
FIG. 7 illustrates an embodiment of a computing architecture.

FIG. 7 illustrates an embodiment of an exemplary computing architecture 700 comprising a computing system 702 that may be suitable for implementing various embodiments as previously described. In various embodiments, the computing architecture 700 may comprise or be implemented as part of an electronic device. In some embodiments, the computing architecture 700 may be representative, for example, of a system that implements one or more components of the system 100. In some embodiments, computing system 702 may be representative, for example, of the mobile devices 110, authentication server 120, the virtual account number server 140, and/or the application server 150 of the system 100. The embodiments are not limited in this context. More generally, the computing architecture 700 is configured to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 702 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 702.

As shown in FIG. 7, the computing system 702 comprises a processor 704, a system memory 706 and a system bus 708. The processor 704 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 704.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computing system 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies. The computing system 702 is generally is configured to implement all logic, systems, methods, apparatuses, and functionality described herein with reference to FIGS. 1-6.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 100, e.g., the applet 103, private keys 104, URL 106, URL with encrypted data 108, operating system 112, autofill service 114, web browser 115, the other applications 116, the authentication application 123 and the VAN generator 142.

A user can enter commands and information into the computing system 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computing system 702. In addition to the monitor 744, a computer typically includes other peripheral output devices, such as speakers, printers, and so forth.

The computing system 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computing system 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 752 and the WAN 754.

When used in a LAN networking environment, the computing system 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computing system 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computing system 702, or portions thereof, can be stored in the remote memory/storage device 750. It will be appreciated that the network connections shown are exemplary and other means of establishing a communications link between the computers can be used.

The computing system 702 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. An apparatus, comprising:
a display;
a processor circuit; and
a memory storing an operating system (OS), a first application, and instructions, the instructions when executed by the processor circuit, cause the processor circuit to perform the steps of:
outputting, using the first application on the display, a payment form comprising an account number field, an expiration date field, and a card verification value (CVV) field;
receiving, using the OS, from a communications interface of a contactless card, a uniform resource locator (URL) comprising encrypted data;
downloading, using the OS, a second application from an application server based on the URL;
installing and executing, using the OS, the second application;
transmitting, using the second application, the encrypted data to an authentication server;
receiving, using the second application from a virtual account number server in communication with the authentication server, and based on the transmission of the encrypted data to the authentication server, a virtual account number, an expiration date associated with the virtual account number, and a CVV associated with the virtual account number;
providing, using the second application, the virtual account number, expiration date, and CVV to an autofill service of the OS; and
autofilling, using the autofill service of the OS, the virtual account number to the account number field, the expiration date to the expiration date field, and the CVV to the CVV field.

2. The apparatus of claim 1, wherein the first application comprises at least one of: (i) a web browser, (ii) a native OS application, and (iii) an application available in an application store, wherein the second application comprises at least one of: (i) a progressive web application executing in the web browser, (ii) an instant application, and (iii) an application available external to the application store, the second application comprising a subset of pages of an account management application, wherein the expiration date and the CVV comprise one or more of: (i) an expiration date and a CVV generated by the virtual account number server, and (ii) an expiration date and a CVV of the contactless card received from an account database, the memory storing instructions which when executed by the processor circuit, cause the processor circuit to perform the step of:
    submitting the form comprising the virtual account number in the account number field, the expiration date in the expiration date field, and the CVV in the CVV field.

3. The apparatus of claim 2, the memory storing instructions which when executed by the processor circuit, cause the processor circuit to perform the step of:
    transmitting, using the OS, at least one attribute of the OS to the application server.

4. The apparatus of claim 2, wherein the second application comprises the progressive web application,
    wherein downloading the second application comprises receiving, using the OS, the progressive web application responsive to receiving the URL, wherein the URL comprises a universal link URL to the progressive web application;
    wherein executing the second application comprises executing the progressive web application in the web browser; and
    the memory storing instructions which when executed by the processor circuit, cause the processor circuit to perform the steps of:
    determining, using the progressive web application, to receive the instant application;
    receiving the instant application;
    executing the instant application using the OS;
    receiving, using the instant application, the virtual account number, expiration date, and CVV; and
    providing, using the instant application, the virtual account number, expiration date, and CVV to the autofill service.

5. The apparatus of claim 1, the memory storing instructions which when executed by the processor circuit, cause the processor circuit to perform the steps of:
    receiving, using the second application, the URL comprising the encrypted data, the encrypted data encoded into an encoded format;
    decoding, using the second application, the encrypted data to an unencoded format; and
    transmitting, using the second application, the decoded encrypted data to the authentication server.

6. The apparatus of claim 1, wherein the virtual account number, expiration date, and CVV are provided to an application programming interface (API) of the autofill service.

7. A method, comprising:
    outputting on a display, by a first application executing on a processor circuit of a device, a payment form comprising an account number field, an expiration date field, and a card verification value (CVV) field;
    receiving, by an operating system (OS) executing on the processor circuit, from a communications interface of a contactless card, a uniform resource locator (URL) comprising encrypted data;
    downloading, by the OS, a second application from an application server based on the URL;
    installing and executing, by the OS, the second application;
    transmitting, by the second application, the encrypted data to an authentication server;
    receiving, by the second application from a virtual account number server in communication with the authentication server, and based on the transmission of the encrypted data to the authentication server, a virtual account number, an expiration date associated with the virtual account number, and a CVV associated with the virtual account number;
    providing, by the second application, the virtual account number, expiration date, and CVV to an autofill service of the OS; and
    autofilling, by the autofill service of the OS, the virtual account number to the account number field, the expiration date to the expiration date field, and the CVV to the CVV field.

8. The method of claim 7, wherein the first application comprises at least one of: (i) a web browser, (ii) a native OS application, and (iii) an application available in an application store, wherein the second application comprises at least one of: (i) a progressive web application executing in the web browser, (ii) an instant application, and (iii) an application available external to the application store, the second application comprising a subset of pages of an account management application, wherein the expiration date and the CVV comprise one or more of: (i) an expiration date and a CVV generated by the virtual account number server, and (ii) an expiration date and a CVV of the contactless card received from an account database, the method further comprising:
    submitting the form comprising the virtual account number in the account number field, the expiration date in the expiration date field, and the CVV in the CVV field.

9. The method of claim 8, further comprising:
    transmitting, by the OS, at least one attribute of the OS to the application server.

10. The method of claim 8, wherein the second application comprises the progressive web application,
    wherein downloading the second application comprises receiving, by the OS, the progressive web application responsive to receiving the URL, wherein the URL comprises a universal link URL to the progressive web application;
    wherein executing the second application comprises executing the progressive web application in the web browser; and
    the method further comprising:
    determining, by the progressive web application, to receive the instant application;
    receiving the instant application; and
    executing the instant application in the OS; wherein the instant application:
    receiving, by the instant application, the virtual account number, expiration date, and CVV; and
    providing, by the instant application, the virtual account number, expiration date, and CVV to the autofill service.

11. The method of claim 7, further comprising:
    receiving, by the second application, the URL comprising the encrypted data, the encrypted data encoded into an encoded format;
    decoding, by the second application, the encrypted data to an unencoded format; and
    transmitting, by the second application, the decoded encrypted data to the authentication server.

12. A non-transitory computer-readable storage medium storing an operating system (OS), a first application, and instructions, the instructions when executed by a processor circuit cause the processor circuit to perform the steps of:
    outputting, using the first application, a payment form comprising an account number field, an expiration date field, and a card verification value (CVV) field on the display;

receiving, using the OS, from a communications interface of a contactless card, a uniform resource locator (URL) comprising encrypted data;

downloading, using the OS, a second application from an application server based on the URL;

installing and executing, using the OS, the second application;

transmitting, by the second application, the encrypted data to an authentication server;

receiving, using the second application from a virtual account number server in communication with the authentication server, and based on the transmission of the encrypted data to the authentication server, a virtual account number, an expiration date associated with the virtual account number, and a CVV associated with the virtual account number;

providing, using the second application, the virtual account number, expiration date, and CVV to an autofill service of the OS; and autofilling, using the autofill service of the OS, the virtual account number to the account number field, the expiration date to the expiration date field, and the CVV to the CVV field.

13. The non-transitory computer-readable storage medium of claim 12, wherein the first application comprises at least one of: (i) a web browser, (ii) a native OS application, and (iii) an application available in an application store, wherein the second application comprises at least one of: (i) a progressive web application executing in the web browser, (ii) an instant application, and (iii) an application available external to the application store, the second application comprising a subset of pages of an account management application, wherein the expiration date and the CVV comprise one or more of: (i) an expiration date and a CVV generated by the virtual account number server, and (ii) an expiration date and a CVV of the contactless card received from an account database, further comprising instructions which when executed by the processor circuit causes the processor circuit to perform the step of:

submitting the form comprising the virtual account number in the account number field, the expiration date in the expiration date field, and the CVV in the CVV field.

14. The non-transitory computer-readable storage medium of claim 13, further comprising instructions which when executed by the processor circuit causes the processor circuit to perform the step of:

transmitting, using the OS, at least one attribute of the OS to the application server.

15. The non-transitory computer-readable storage medium of claim 13, wherein the second application comprises the progressive web application, wherein downloading the second application comprises receiving, using the OS, the progressive web application responsive to receiving the URL, wherein the URL comprises a universal link URL to the progressive web application, wherein executing the second application comprises executing the progressive web application in the web browser, and further comprising instructions which when executed by the processor circuit to causes the processor circuit to perform the steps of:

determining, using the progressive web application, to receive the instant application;

receiving the instant application;

executing the instant application using the OS;

receiving, using the instant application, the virtual account number, expiration date, and CVV; and providing, using the instant application, the virtual account number, expiration date, and CVV to the autofill service.

16. The non-transitory computer-readable storage medium of claim 12, further comprising instructions which when executed by the processor circuit causes the processor circuit to perform the steps of:

receiving, using the second application, the URL comprising the encrypted data, the encrypted data encoded into an encoded format;

decoding, using the second application, the encrypted data to an unencoded format; and transmitting, using the second application, the decoded encrypted data to the authentication server.

* * * * *